Figure 1:
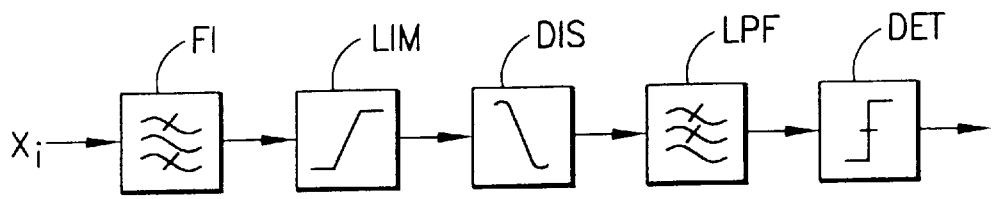

United States Patent
Perez Abadia et al.

[11] Patent Number: 6,101,219
[45] Date of Patent: Aug. 8, 2000

[54] ADAPTIVE EQUALISER

[75] Inventors: Mariano Perez Abadia, Madrid; Gregorio Nunez Leon De Santos, Toledo; Alfonso Fernandez Duran, Madrid, all of Spain

[73] Assignee: Alcatel NV, Netherlands

[21] Appl. No.: 08/663,288

[22] PCT Filed: Oct. 18, 1995

[86] PCT No.: PCT/EP95/04087

§ 371 Date: Sep. 10, 1996

§ 102(e) Date: Sep. 10, 1996

[87] PCT Pub. No.: WO96/13109

PCT Pub. Date: May 2, 1996

[30] Foreign Application Priority Data

Oct. 21, 1994 [ES] Spain ................................ 9402196

[51] Int. Cl.[7] .................................................. H03H 7/30
[52] U.S. Cl. .................... 375/231; 375/229; 375/233
[58] Field of Search .......................... 367/134; 375/222, 375/231, 232, 229, 230, 350; 333/14, 18; 329/318

[56] References Cited

U.S. PATENT DOCUMENTS

| 4,489,416 | 12/1984 | Stuart ................................ 375/231 |
| 4,747,068 | 5/1988 | Voorman et al. ....................... 375/232 |
| 5,434,883 | 7/1995 | Kimoto et al. ........................ 375/231 |
| 5,563,911 | 10/1996 | Uesugi et al. ........................ 375/232 |

*Primary Examiner*—Stephen Chin
*Assistant Examiner*—Joseph Roundtree
*Attorney, Agent, or Firm*—Ware, Fressola, Van Der Sluys & Adolphson LLP

[57] ABSTRACT

An adaptive equaliser particularly for equalising digital signals with analogue modulation, where use is made of a training sequence formed by a previously known sequence of symbols which is applied to said equaliser simultaneously with the demodulated signal present in the receiver. In this way a first estimate is made of the coefficients of the filter or filters of the equaliser that compensate the linear distortions in the transmission channel. The training sequence (TS), before being used in the equaliser (CEQ), is first applied to a lowpass filter whose transfer function is the same as that of the premodulation filter employed in the modulator. This transfer function also incorporates distortion effects, both linear and non-linear, to which the data are subjected in the receive side when they have been demodulated prior to their detection or regeneration.

9 Claims, 3 Drawing Sheets

ADAPTIVE EQUALISER

TECHNICAL FIELD

This invention refers to an equaliser of the adaptive type employed in transmission systems where the transmission channel does not have a flat transfer function, but where, due particularly to multipropagation effects, the signal at the receiver input includes linear distortion that considerably impairs its quality.

To correct these effects, use is made of channel equalisers, the purpose of which is to compensate these effects by means of certain mathematical algorithms. These algorithms converge towards an error signal with value zero or sufficiently small when the signals they receive are subject, during reception, to a linear process; however, the same does not occur, or at least not at the same speed, when the signals are subjected to a significantly non-linear process.

BACKGROUND OF THE INVENTION

The use of frequency modulation techniques of the GFSK type, like that employed in the Digital European Cordless Telecommunications (DECT) standard, make it advisable to use frequency demodulators based, for example, on discriminators; in this way it is possible to recover the data by means of a simple threshold detector in order to decide between the two logic states, 0 or 1.

In certain environments where these systems are applied, this type of receiver is sufficient because the maximum spread of the signal at the receiver is considerably less than one symbol and, consequently, the intersymbol interference produced in the channel is hardly appreciable. However in applications where radio coverage is greater, the latter is not true. In such situations it becomes advisable to make use of equalisers that remedy this signal-degrading effect resulting in the error probability of recovered symbols being notably enhanced.

For this reason, use is made of an equaliser of the type illustrated in the article "Adaptive equalisation for DECT systems operating in low time-dispersive channels" by J. Fuhl and G. Schultes, published in the magazine Electronics Letters of Nov. 25, 1993, vol. 29, No.24, pages 2076 and 2077.

In this article use is made of an equaliser of the well known type DFE (Decision Feedback Equaliser). In it, the training sequence employed is the 16-bit burst synchronisation as defined by the DECT. The training sequence is stored in a ROM and applied to the equaliser at the moment when the 16 bits appear at the receiver input, instead of the actually received signal. This prevents the possible errors produced in the detector, when the filter coefficients are still inexact, from being fed back to the equaliser and, therefore, a faster convergence occurs.

Nevertheless, when the demodulator is of the non-linear type like, for example, a frequency discriminator, even under ideal conditions of propagation, the demodulated signal can be considerably distorted due to the action of the demodulator. Under these conditions, adequate convergence does not occur, since no allowance is made for the non-linear process to which the received signals are subjected.

SUMMARY OF THE INVENTION

In the equaliser training phase, this sequence is applied to the equaliser simultaneously with that received in order to make thereby a first estimate of the coefficients of the filter or filters of the equaliser.

So as to make possible and hasten the convergence of the coefficients mentioned, the training sequence is not constituted by the digital symbols transmitted but, instead, it is formed by a cadence of samples that represents the training sequence just as it would be received at the output of the demodulator in the absence of noise and of multipropagation.

Thus, the new training sequence is obtained through the application of lowpass filter whose transfer function is the same as that of the premodulation filter employed in the modulator and, thereby, allowance is made for the prior linear distortion due to the filtering that occurs in the modulator.

Subsequently the non-linear distortion effects to which the data are subjected in the reception side during demodulation and prior to their detection or regeneration, are included; and, finally, the effects of the predetection filter for limiting noise bandwidth are incorporated and which can partly filter out the high-frequency components of the signal.

With the application of this invention, a much more realistic convergence of the equaliser filter coefficients takes place since allowance is made for all prior impairment effects suffered by the signal that is actually applied to the equaliser, whereby the error probability for the same noise conditions is considerably improved.

BRIEF DESCRIPTIONS OF THE FIGURES

Figure 2:
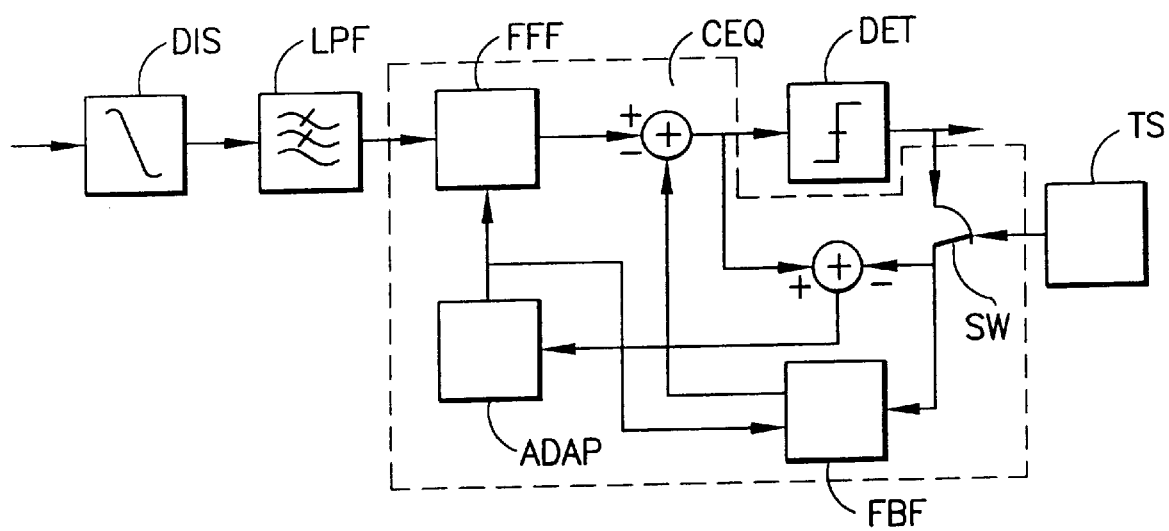
Figure 3:
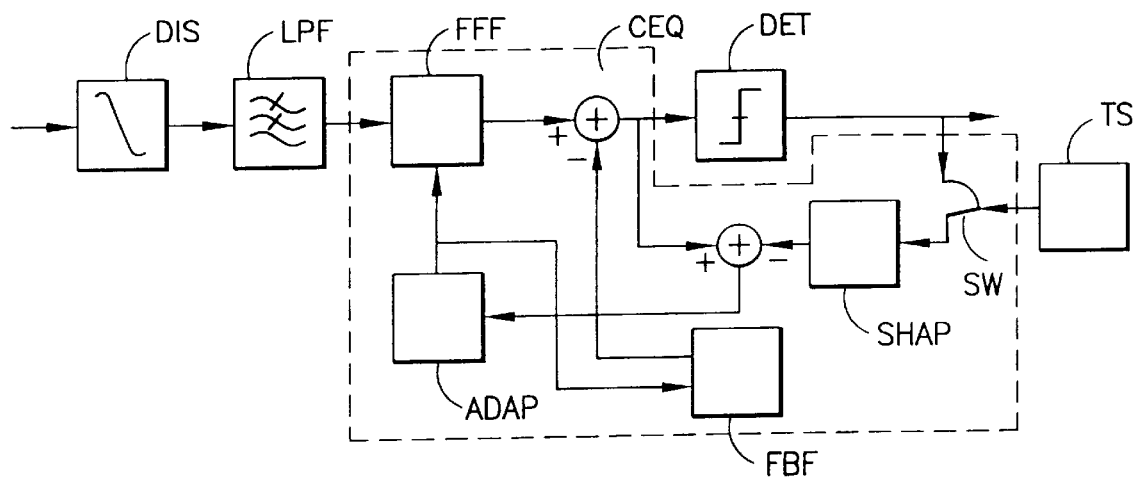
Figure 4:
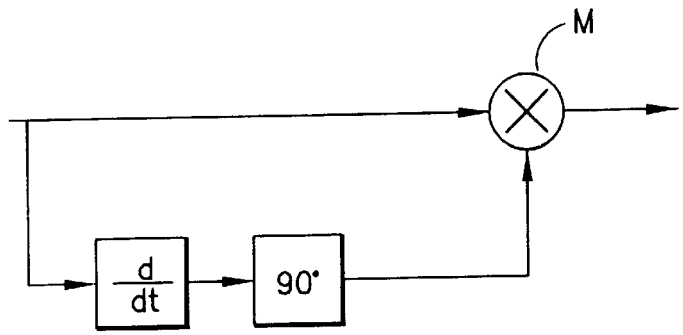
Figure 5:
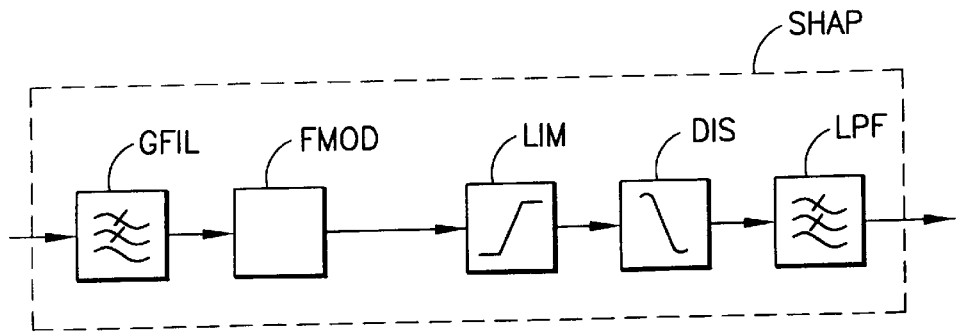
Figure 6A:
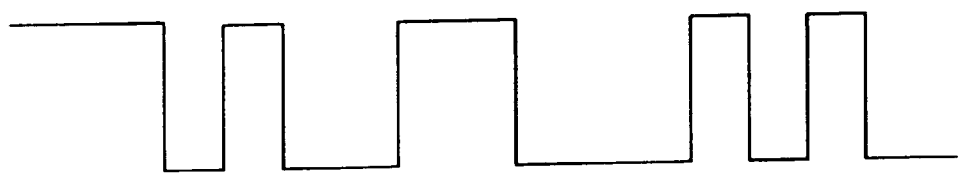
Figure 6B:
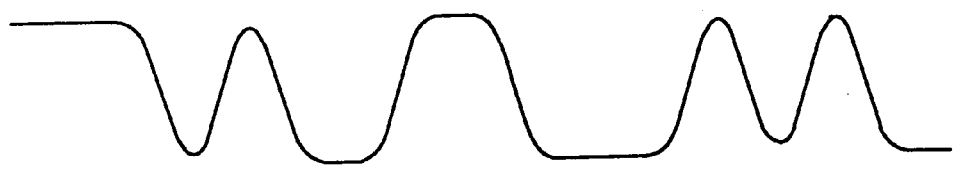
Figure 6C:
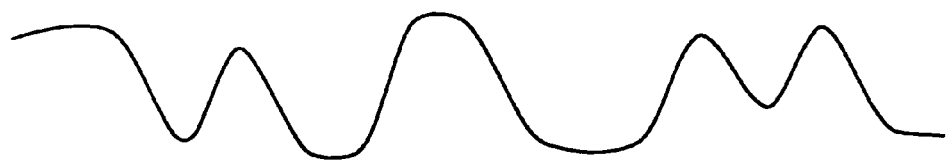

A fuller explanation of the invention is given in a description of an implementation based on the figures attached, in which:

FIG. 1 shows a general block diagram of the final part of a receiver based on a frequency discriminator without equaliser, FIG. 2 shows part of the above diagram, in which an equaliser of the type known as DFE has been included, FIG. 3 shows the previous case but in which a signal-shaping module that is applied to the training sequence, in accordance with the invention, has been incorporated, FIG. 4 shows the configuration of a demodulator based on a frequency discriminator, FIG. 5 shows, in the form of functional blocks, the different effects that the signal suffers on its way to the demodulator and which are taken into account in the shaping of the signal that is fed back to the equaliser, and FIG. 6.A shows the waveform of the training sequence employed in the DFE according to the state of the art, and FIGS. 6.B and 6.C shows the waveforms employed according to the invention, including, respectively, only the premodulator filter and the series of effects, both linear and non-linear, in the receive side.

BEST MODE FOR CARRYING OUT THE INVENTION

This invention, in a preferred implementation, finds application in the receiver of a digital communications system with GFSK modulation, which is the type employed in the Digital European Cordless Telecommunications (DECT) system.

FIG. 1, as already mentioned, shows part of the receive side used, in which a frequency conversion takes place to an intermediate frequency. Once at the intermediate frequency, the modulated signal $X_i$ is first applied to a bandpass filter FI, the bandwidth of which is that of the channel, in order to suppress out-of-band noise as well as other components resulting from the earlier mixing and which are located outside the band (mainly image frequency).

Subsequently it is applied to an amplitude limiter LIM, the function of which is to clip the input signal so that, at its output, the signal amplitude is always constant. This means the demodulation of the signal can be performed without recurring to automatic gain control processes. Since this is a system with frequency modulation and constant envelope, when filtering the clipped signal again with an intermediate frequency filter, the original signal is obtained but, this time, with an amplitude that is always constant.

A frequency discriminator DIS is then employed, the structure of which is shown in FIG. 4. As already known, this is a multiplier M, which is a non-linear element that multiplies the signal to be demodulated by another which is the derivative of the first and shifted in phase by 90°.

The fact that the phase shift for each symbol period is not perfectly defined, as occurs with GMSK for example, makes phase demodulation practically unfeasible.

The output signal from the frequency discriminator DIS is applied to a lowpass filter LPF to remove the noise, especially that of the highest frequencies the effect of which is the most pernicious since, as is known, the spectral noise density at the output of a frequency demodulator is of the parabolic type.

Finally the output signal from the above lowpass filter LPF is sent to a symbol detector DET which, in the simplest form, is a comparator with a reference level that corresponds to that which the demodulator would provide in the absence of a modulating signal; that is, when only the carrier is received. In this event, the values above the reference level are equivalent to one logical value and, below it to the other logical value. Clearly much more complex detectors can be used, which give a lower probability of error under the same noise conditions, but this has no effect on the object of the invention.

Initially, the DECT system was used in reduced environments where the maximum delay was much less than a symbol period, consequently the multipropagation effect was hardly significant and channel equalisation was unnecessary. Nevertheless, later usage in environments of greater coverage results in that the channel model presents serious impairments which can be corrected by using equalisers.

This is possible, as has now been proposed in various articles, by employing the synchronising sequence of the DECT bursts as training sequences for the proposed equaliser.

With reference to all of the foregoing, FIG. 2 shows part of a receiver used in the DECT. It includes an equaliser CEQ of the type known as DFE (Decision Feedback Equaliser) that uses an RLS adaptation algorithm, since there are only 16 bits available for the filter coefficients to reach suitable values.

This equaliser is situated just before the symbol detector DET and has a frequency domain response that compensates for the non-linear response curve of the channel resulting from the distortion in it. In this way, the signal that enters the symbol detector DET, when equaliser convergence has been completed, would be free from pernicious effects due to the linear distortion in the channel over which the signal coming from the associated transmitter is received.

In this type of equaliser, in order to reach convergence faster, use is made of a training sequence that is already known at both ends. This means that, even when the initial values of the coefficients of the equaliser CEQ are far from the values they should finally have (which would result in a high number of detector errors and consequently a very slow or even unattainable convergence), there is more rapid and certain convergence since the data fed back to the equaliser CEQ in question are correct.

This is also shown in FIG. 2 in which the training sequence TS, which in this case for DECT is the burst synchronising sequence, is stored in a logic circuit and is fed back to the equaliser CEQ via the switch SW when the arrival of said synchronising sequence is expected within the burst starting to be received. When the sequence has been received fully, the switch SW changes position in order to fed back the data recovered by the symbol detector DET, which now correspond to information bits.

Nevertheless, along the transmission chain as far as the input to the symbol detector DET, the signal goes through different elements that distort it both linearly and non-linearly, which are not initially allowed for in the equalisation process. For this reason, as can be seen in FIG. 3, a wave-shaping module SHAP is included which receives the symbols that are fed back to the equaliser CEQ, either of the training sequence or of the actual output symbols from the detector, accordingly.

The wave shaping module SHAP implements a transfer function which consists of a table of values that have been obtained experimentally by applying the training sequence in the transmitter, before the modulator, and taking the corresponding readings of the signal obtained at the input to the symbol detector DET.

FIG. 5 shows symbolically what elements are taken into account in the transfer function of the wave-shaper SHAP and which are, on the transmission side, the premodulation Gaussian filter GFIL and the frequency modulator FMOD and, in the reception side, the amplitude limiter LIM, the frequency discriminator DIS and the lowpass filter LPF in predetection.

The filters introduce a linear distortion that produces an increase in the intersymbol interference, while the frequency modulator FMOD and the frequency discriminator DIS introduce non-linear distortion because the voltage-frequency conversion characteristic in one case and the frequency-voltage characteristic in the other are not constant as they would be in an ideal situation. These effects are also allowed for by the equaliser.

When the training phase of the equaliser CEQ has been completed and convergence has been reached, the adaptation algorithm, which is developed in a calculation module ADAP, is frozen, whereby the coefficients calculated in both filters, that of current symbols FFF (feed forward(feed back filter)filter) and that of past symbols FBF, are held constant until the end of the burst.

Alternatively, and according to a selection made in the equaliser, when the training sequence has been received, the data obtained at the output of the detector DET are fed back, maintaining the adaptation algorithm active.

To demonstrate more clearly the improvement produced by the invention on the equaliser, FIG. 6.A shows the training sequence employed in an equaliser according to the state of the art; on the other hand, FIG. 6.B shows the same training sequence as received at the input of the detector DET in the absence of noise and in the event that all the elements in the chain up to the detector input are ideal. According to the invention, the wave-shaper SHAP incorporates, at least, this effect.

Finally FIG. 6.C shows again the training sequence that is received at the input of the detector DET in the absence of noise and taking into account the non-ideal effects of the elements mentioned above. In the complete application of the invention, the wave-shaper SHAP incorporates all these effects, which are stored in a read-only memory (ROM).

An equaliser, as is known, in the training phase performs a "comparison" between the known training sequence and the signal received at the input to the decision circuit, such that an error signal is obtained, the mean square value of which tends asymptotically to zero. As the signal at the input to the equaliser takes the form of the sequence in FIG. 6.C but to which is added noise and linear distortion due to the effects of the channel, it can be seen that if the comparison is made with the sequence of FIG. 6.C, the convergence is faster and more precise than if it is done with the sequence of FIG. 6.B which only takes into account the premodulation Gaussian filter and, naturally, much more than if the sequence employed is that of FIG. 6.A which only contemplates the actual bits in the training sequence.

Definitively then, the result is improved error probability.

We claim:

1. An adaptive equaliser for equalising digital signals with analogue modulation, generated as a result of a premodulation filter (GFIL) said equaliser having means for generating a training sequence formed by a previously known sequence of symbols (TS) and which is applied to the equaliser simultaneously with the reception of the digital signals in order to perform an initial estimation of the coefficients of the filter or filters of the equaliser during a training phase of the operation; said equaliser being characterised in that the means for generating the training sequence employed in its training phase is the result of applying the previously known sequence of symbols (TS) to a filtering means (SHAP) whose transfer function is the same as that of the premodulation filter (GFIL) employed in the modulator associated with the generation of the digital signals with analogue modulation.

2. An adaptive equaliser according to claim 1, characterised in that the training sequence employed in the training phase also is the result of further applying the previously known sequence of symbols (TS) to linear modules (GFIL, LPF) and non-linear modules (FMOD, DIS) so that the effects of distortion, both linear and non-linear, that the digital signals with analogue modulation experience in the receive side when these digital signals have been demodulated and prior to their detection or regeneration, is further represented in the training sequence.

3. An adaptive equaliser according to claim 2, characterised in that said effects of distortion, both linear and non-linear, are obtained by readings at the output of the demodulator when the corresponding carrier modulated by the training sequence is applied to the input of the receiver.

4. An adaptive equaliser according to claim 1, characterised in that to obtain the training sequence employed in the training phase, the known sequence of symbols (TS) is applied to a wave shaper (SHAP) which implements the transfer function that includes the effects of distortion mentioned.

5. An adaptive equaliser according to claim 4, wherein the digital signals with analogue modulation are received in bursts, and wherein the initial estimation of the coefficients of the filter or filters of the equaliser is performed with an adaptive algorithm, characterised in that when the training phase has been completed, said equaliser (CEQ) freezes the adaptation algorithm so that the coefficients of its filters remain constant until the end of the burst that is being received.

6. An adaptive equaliser according to claim 4, wherein the adaptive equalizer includes a symbol detector (DET) to detect the symbols represented by the digital signals, and wherein the adaptive equalizer enters a tracking phase after the training phase, characterised in that, once the training phase has been completed, when the equaliser (CEQ) is in the tracking phase, the data obtained by the detector (DET) that are fed back to the adaptive equaliser, are first passed through the wave shaper (SHAP) so that during the tracking phase, allowance is also made for the effects of both linear and non-linear distortion suffered by the signal present at the input to the detector (DET).

7. An adaptive equaliser for equalising digital signals with analogue modulation generated by a modulator having a premodulation filter associated therewith that has a given transfer function; the digital signals representing symbols, said digital signals received by the adaptive equaliser from the output of a lowpass filter (LPF) forming part of a receiver, the output of the adaptive equaliser applied to a detector (DET) forming an output stage of the receiver, the receiver having means for generating a known sequence of symbols (TS), wherein the adaptive equaliser has means for generating a training sequence (SHAP) used in a training phase of the equaliser, the training sequence being the result of applying the known sequence of symbols (TS) to the wave shaper (SHAP), the wave shaper having a transfer function corresponding to at least the transfer function of the premodulation filter (GFIL) used by the modulator.

8. An adaptive equalizer according to claim 7, wherein the wave shaper further includes a premodulation filter (GFIL) having a transfer function corresponding to that of the lowpass filter (LPF) associated with the receiver.

9. An adaptive equalizer according to claim 8, wherein the wave shaper further includes a frequency modulator (FMOD) and a frequency discriminator (DIS) for introducing non-linear distortion to the generated training sequence of symbols (TS) corresponding to the non-linear distortion associated with the digital signals.

* * * * *